United States Patent
Yoon et al.

(10) Patent No.: US 7,359,625 B2
(45) Date of Patent: Apr. 15, 2008

(54) RECORDING MEDIUM WITH CONTENT STREAM DATA RECORDED THEREON, RECORDING APPARATUS, AND REPRODUCING APPARATUS THEREFOR

(75) Inventors: Bum-sik Yoon, Gyeonggi-do (KR); Sung-wook Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 1311 days.

(21) Appl. No.: 10/041,760

(22) Filed: Jan. 10, 2002

(65) Prior Publication Data

US 2002/0091851 A1 Jul. 11, 2002

Related U.S. Application Data

(60) Provisional application No. 60/262,104, filed on Jan. 18, 2001.

(30) Foreign Application Priority Data

Jan. 10, 2001 (KR) .................... 2001-1233

(51) Int. Cl.
*H04N 5/00* (2006.01)
*H04L 12/28* (2006.01)

(52) U.S. Cl. .................... 386/125; 386/45; 386/46; 386/96; 386/110; 386/126; 386/15; 386/70; 386/82; 386/105; 386/106; 370/402; 370/471; 370/522; 360/86

(58) Field of Classification Search .............. 386/95, 386/83, 96, 125, 126, 105, 106, 45, 46; 370/84, 370/94.2, 402, 471; 360/86
See application file for complete search history.

(56) References Cited

U.S. PATENT DOCUMENTS

| | | | | |
|---|---|---|---|---|
| 5,537,409 A | * | 7/1996 | Moriyama et al. | 370/471 |
| 6,310,897 B1 | * | 10/2001 | Watanabe et al. | 370/522 |
| 6,456,783 B1 | * | 9/2002 | Ando et al. | 386/125 |
| 6,580,869 B1 | | 6/2003 | Ando et al. | |

(Continued)

FOREIGN PATENT DOCUMENTS

EP 1 005 044 5/2000

(Continued)

OTHER PUBLICATIONS

Japanese Office Action dated Jul. 20, 2004.

*Primary Examiner*—John Miller
*Assistant Examiner*—Jamie Vent
(74) *Attorney, Agent, or Firm*—Stein, McEwen & Bui, LLP

(57) ABSTRACT

A recording medium having content stream data recorded thereon and a recording and reproducing apparatus provided therefor. On the recording medium, content stream data is recorded as a stream object formed of one or more stream object units, each having a predetermined size and one or more stream packs. Each of the stream packs has an application time stamp indicating reproducing time information and a plurality of application packets in which the content stream data is packed. Each of the stream object units, excluding the last stream object unit, has at least one entire application time stamp. Thus, search information on all of the stream object units is correctly obtained, and program searching is carried out without error.

20 Claims, 6 Drawing Sheets

U.S. PATENT DOCUMENTS

| | | |
|---|---|---|
| 6,763,179 B1 | 7/2004 | Park et al. |
| 2001/0028655 A1* | 10/2001 | Noda et al. ................. 370/402 |
| 2003/0133529 A1 | 7/2003 | Yoo et al. |

FOREIGN PATENT DOCUMENTS

| | | |
|---|---|---|
| EP | 1039468 | 9/2000 |
| EP | 1 051 027 | 11/2000 |
| JP | 2000-244850 | 9/2000 |
| JP | 2000-358215 | 12/2000 |
| WO | 00/14744 | 3/2000 |
| WO | WO 00/46803 | 8/2000 |
| WO | WO 00/49803 | 8/2000 |
| WO | WO 00/57421 | 9/2000 |
| WO | 00/68946 | 11/2000 |
| WO | 01/54126 A1 | 7/2001 |

* cited by examiner

RECORDING MEDIUM WITH CONTENT STREAM DATA RECORDED THEREON, RECORDING APPARATUS, AND REPRODUCING APPARATUS THEREFOR

CROSS REFERENCE TO RELATED APPLICATIONS

This application claims the benefit of Korean Application No. 2001-1233 filed on Jan. 10, 2001, in the Korean Intellectual Property Office, and U.S. Provisional Application No. 60/262,104 filed on Jan. 18, 2001, in the U.S. Patent and Trademark Office, now expired, the disclosures of which are incorporated herein by reference.

BACKGROUND OF THE INVENTION

1. Field of the Invention

The present invention relates to recording and reproducing content stream data, and more particularly, to a recording medium with content stream data recorded thereon, wherein a recording apparatus and a reproducing apparatus is provided therefor.

2. Description of the Related Art

A single piece of various forms of content, such as, for example, a movie, a music track, etc., is referred to as a program in this specification.

FIG. 1 shows the data structure of a conventional program.

Generally, content stream data of a program is formed by one stream object (SOB). Referring now to FIG. 1, an SOB is formed of a chain in which one or more Stream Object Units (SOBUs) are linked. SOBUs are units in which data is recorded and edited. However, since the input and/or output speeds of data streams of a program may change in recording and/or reproducing, the corresponding SOBU lengths on a time axis may differ from one another. An SOBU includes a plurality of stream packs S_PCKs. SOBUs included in the same SOB include the same number of stream packs.

A stream pack S_PCK is formed by a pack header and a stream packet S_PKT. A stream packet S_PKT contains one or more application packets (AP_PKTs). An application packet AP_PKT is a piece of a bit stream input when a recording apparatus records data, or output when a reproducing apparatus reproduces data. Therefore, in front of the application packet AP_PKT, an Application Time Stamp (ATS) is located. An ATS is reproducing time information of the application packet AP_PKT following the ATS. The start and end of an application packet AP_PKT may not match the start and end of the stream pack S_PCK. That is, for example, an application packet AP_PKT may stretch over a boundary between two stream packs (i.e., two neighboring SOBUs).

To arbitrarily access a program recorded as shown in FIG. 1, search information is generally used. Search information may include information on a location of certain data in a program, program reproducing time information, and program recording time information. Search information may have various formats depending on applications. However, to reduce an amount of information and enable quick search, a hierarchical structure is frequently used to search for data in the program.

If search information of a program is formed of three layers, like for example, a cell layer, an SOB layer, and an SOBU layer, the search information includes information on which cell or cells correspond to a given program, information on which SOB or SOBs correspond to a given cell, and information on which SOBU or SOBUs correspond to a given SOB. Particularly, information on which SOBU or SOBUs correspond to a given SOB is referred to as a MAPping List (MAPL).

A mapping list contains an incremental application packet arrival time (IAPAT), which indicates a duration of a corresponding SOBU. The arrival time of an application packet AP_PKT contained in the corresponding SOBU is needed for obtaining the IAPAT. However, for determining the IAPAT of SOBUs, different methods are used depending on a location of the SOBU in an SOB. That is, methods may differ depending on whether or not the SOBU is a last SOBU in the SOB.

For example, when an SOB includes M SOBUs, a value obtained by accumulating IAPATs of the first SOBU through the i-th SOBU, excluding the last SOBU, should be less than a value obtained by adding 1 to the arrival time of the first application packet of SOBU (i+1). The IAPAT is assumed to be an integer expressed in units of 1.0, and the initial value of accumulation is 0. The above is expressed by the following relation:

$$SOBU\_S\_APAT(i+1) \leq SUM\_IAPAT(i) \leq SOBU\_S\_APAT(i+1)+1$$

Here, SOBU_S_APAT(i+1) denotes an arrival time of a first application packet APPKT and SUM_IAPAT(i) denotes a value obtained by accumulating IAPAT values of all the preceding SOBUs and the current SOBU #i.

If an SOB includes M SOBUs, a value obtained by accumulating the first through the M-th IAPAT should be greater than the arrival time of the last application packet AP_PKT but greater by less than 1. All of the IAPATs are assumed to be integers expressed in units of 1.0, and the initial value of accumulation is 0.

Also, for SOBU #M, a value obtained by accumulating IAPATs of the first SOBU through SOBU #M should be greater than the arrival time of the last application packet AP_PKT included in SOBU #M, and should be less than or equal to a value obtained by adding 1 to the arrival time of the last application packet included in SOBU #M. This is expressed by the following equation:

$$SOBU\_E\_APAT(M) \leq SUM\_IAPAT(M) \leq SOBU\_E\_APAT(M)+1$$

Here, SOBU_E_APAT(M) denotes the arrival time of the last application packet included in SOBU#M.

A size of an application packet (AP_PKT_SZ) satisfies the following:

$$AP\_PKT\_SZ \leq 2018 \times \{SOBU\_SZ\} - 2$$

Here, SOBU_SZ denotes a size of an SOBU. The above expression is made considering that at least 30 bytes are needed for a pack header, and 2 bytes are needed for a header extension and a stuffing packet defined in a stream packet, assuming that one SOBU has a number of stream packs equal to a number of SOBU_SZs. Accordingly, this is due to the maximum area for application packets being the result of subtracting 30 bytes from 2048 bytes for one SOBU and then subtracting 2 bytes from the resulting 2018 bytes.

However, according to the above scope of the size of an application packet AP_PKT, a case occurs where no ATS exists in an SOBU.

FIG. 2 illustrates a case where there is no application time stamp (ATS) in a stream object unit (SOBU).

Referring now to FIG. 2, if the last stream pack contained in an SOB is located as shown a first byte forming an ATS is not included in SOBU #M−1. Since only a part of an application packet AP_PKT formed in the last stream pack is located in SOBU #M, there is no ATS included in SOBU #M and SOBU #M−1.

Thus, according to the size of the application packet, a case occurs where there is no corresponding ATS, such as in SOBU #M−1 and SOBU #M. Consequently, the IAPAT for an SOBU which has no corresponding ATS is not obtained, and therefore, a mapping list formed of the IAPATs as search information is not obtained. Accordingly, searching for a program is impossible.

Typically in a case where the last SOBU of an SOB does not have a corresponding ATS, the IAPAT is obtained using a copy of the ATS of the last application packet. However, according to a rule for obtaining IAPATs, the IAPAT(M−1) for SOBU #M−1, and IAPAT(M) for SOBU #M are both "0", and therefore, a program search based on a mapping list formed of IAPAT is not carried out correctly.

IAPAT(i) should meet the following conditions:

$$1 \leq = IAPAT(i) \leq 2^{12}, i=1$$

$$1 \leq = IAPAT(i) \leq 2^{12}-1, 1 \leq i \leq M$$

$$0 \leq = IAPAT(i) \leq 2^{12}-1, i=M$$

FIG. 3 illustrates a conventional method for obtaining an IAPAT in a case where there is no ATS included in the last SOBU.

Referring now to FIG. 3, IAPAT(M−1) is "0" and does not satisfy the above conditions.

SUMMARY OF THE INVENTION

Accordingly, it is an object of the present invention to provide a recording medium with content stream data recorded thereon such that program searching is correctly performed, and having a recording apparatus and a reproducing apparatus provided therefor.

Additional objects and advantages of the invention will be set forth in part in the description which follows and, in part, will be obvious from the description, or may be learned by practice of the invention.

The foregoing and other objects of the present invention are achieved by providing a recording medium on which content stream data is recorded as a stream object formed of one or more stream object units. Each of the stream object units has a predetermined size and has one or more stream packs. Each of the stream packs has at least part of an application time stamp indicating reproducing time information and an application packet, corresponding to said application time stamp, in which the content stream data is packed. Each of the stream object units, excluding a last stream object unit for recording, has at least one entire application time stamp.

According to an aspect of the invention, a size of the application packets is small enough so that each of the stream object units includes at least one entire application time stamp.

According to an aspect of the invention, the size of an application packet AP_PKT_SZ satisfies the following relation:

$$AP\_PKT\_SZ \leq SPayload\_SZ \times \{SOBU\_SZ\} - \{N\_AHE + N\_SByte + ATS\_SZ\},$$

where, SOBU_SZ denotes a size of a corresponding stream object unit, ATS_SZ denotes a size of an application time stamp which is formed in units of bytes, SPayload_SZ denotes a size of data space containing information excluding a fixed header area from the stream pack, N_AHE denotes a number of application header extensions of said corresponding stream object unit, and N_SByte denotes a number of stuffing bytes of the corresponding stream object unit.

According to an aspect of the invention, the size of the application packet AP_PKT_SZ satisfies the following relation:

$$AP\_PKT\_SZ \leq 2018 \times \{SOBU\_SZ\} - 6,$$

where, SOBU_SZ denotes the size of the corresponding stream object unit.

According to yet another aspect of the invention, when N_SByte is 0, the size of the application packet satisfies the following relation:

$$AP\_PKT\_SZ \leq 2018 \times \{SOBU\_SZ\} - 5,$$

where, SOBU_SZ denotes the size of the corresponding stream object unit.

The foregoing and other objects of the present invention are also achieved by providing a recording medium on which content stream data is recorded as a stream object formed of one or more stream object units. Each of the stream object units has a predetermined size and has one or more stream packs, each of the stream packs having at least part of an application time stamp indicating reproducing time information and an application packet, corresponding to said application time stamp, in which the content stream data is packed. A stream object unit having no application time stamp, among the stream object units, has a predetermined application time stamp and a stuffing packet for correction which is recorded continuously after the stream pack.

The foregoing and other objects of the present invention are also achieved by providing a recording apparatus recording a stream object which is formed with at least one stream object unit having one or more stream packs. Each of the stream packs has at least part of an application time stamp indicating reproducing time information and an application packet, corresponding to said application time stamp, in which the content stream data is packed. The recording apparatus has a control unit which generates a mapping list as search information, a clock generation unit which generates a clock value, and a buffer unit buffering input content stream data, adding the clock value provided by the clock generation unit to the input content stream data, and outputting a result. A Stream OBject Unit (SOBU) generating unit packing the content stream data output from the buffer unit and generating the stream object units so that each of the stream object units, excluding a last stream object unit, includes at least one entire application time stamp. The recording apparatus also includes a recording unit recording the generated stream object units for the recording and the mapping list.

According to an aspect of the invention, a size of the application packets is small enough so that each of the stream object units excluding the last stream object unit includes at least one entire application time stamp.

The foregoing and other objects of the present invention are also achieved by providing a recording apparatus recording a stream object which is formed with at least one stream object unit having one or more stream packs. Each of the stream packs has at least part of an application time stamp indicating reproducing time information and an application packet, corresponding to said application time stamp, in which the content stream data is packed. The recording apparatus has a control unit which generates a mapping list as search information, a clock generation unit which generates a clock value, and a buffer unit buffering input content stream data, adding the clock value provided by the clock generation unit to the input content stream data, and outputting a result. The recording apparatus also includes a Stream Object Unit (SOBU) generating unit generating a plurality of stream object units wherein a stream object unit having no corresponding application time stamp has a stuffing packet for correction with a predetermined application time stamp. The recording apparatus also includes a recording unit recording the plurality of generated stream object units for the recording and the mapping list.

According to an aspect, each of the stream object units, excluding a last stream object unit, includes at least one entire application time stamp, the SOBU generation unit makes the last stream object unit include the stuffing packet for correction, and the last stream object unit records the stuffing packet for correction continuously after a last application packet included in the stream object.

The foregoing and other objects of the present invention are also achieved by providing a recording apparatus which records a stream object formed with at least one stream object recording unit having one or more stream packs, each of the stream packs having at least part of an application time stamp indicating reproducing time information and an application packet, corresponding to said application time stamp, in which the content stream data is packed. The recording apparatus has a clock generation unit which generates a clock value, a buffer unit buffering input content stream data, adding the clock value provided by the clock generation unit to the input content stream data, and outputting a result. The recording apparatus also includes a Stream Object Unit (SOBU) generating unit generating a plurality of stream object recording units and a control unit generating search information by regarding a stream object recording unit having no application time stamp to include a predetermined application time stamp and search information. The recording apparatus also includes a recording unit which records the plurality of generated stream object recording units.

According to an aspect, the control unit generates search information by regarding a value which is obtained by adding an integer to a value of an application time stamp of a last stream pack included in the stream object, as the value of the predetermined application time stamp.

According to a further aspect, the control unit generates search information by regarding a value which is obtained by adding an integer to an integer part of an application time stamp of a last stream pack in the stream object, as the value of the predetermined application time stamp.

The foregoing and other objects of the present invention are also achieved by providing a reproducing apparatus reproducing data on a recording medium on which a stream object is formed with at least one stream object unit having one or more stream packs. Each of the stream packs has at least part of an application time stamp indicating reproducing time information and an application packet, corresponding to said application time stamp, in which the content stream data is packed. The reproducing apparatus has a reading unit reading the mapping list and a control unit searching for a corresponding stream object unit by referring to generated search information and by regarding a value which is obtained by adding an integer to a value of an application time stamp of a last stream pack of the stream objects, as the value of the application time stamp for a last stream object unit in the stream object. This is done by referring to the read mapping list.

According to an aspect, the search information includes an Incremental Application Packet Arrival Time.

According to a further aspect, the reading unit has a Stream Object Unit (SOBU) interpreting unit which reads the stream object units, interpreting the read stream object units, and outputting the content stream data. The reading unit also has a clock generating unit which generates a clock value and a buffer unit buffering content stream data provided by the SOBU interpreting unit, based on the clock value provided by the clock generating unit, and outputting the content stream data.

BRIEF DESCRIPTION OF THE DRAWINGS

These and other objects and advantages of the invention will become apparent and more appreciated from the following description of the preferred embodiments, taken in conjunction with the accompanying drawings of which.

DETAILED DESCRIPTION OF THE PREFERRED EMBODIMENTS

Figure 1:
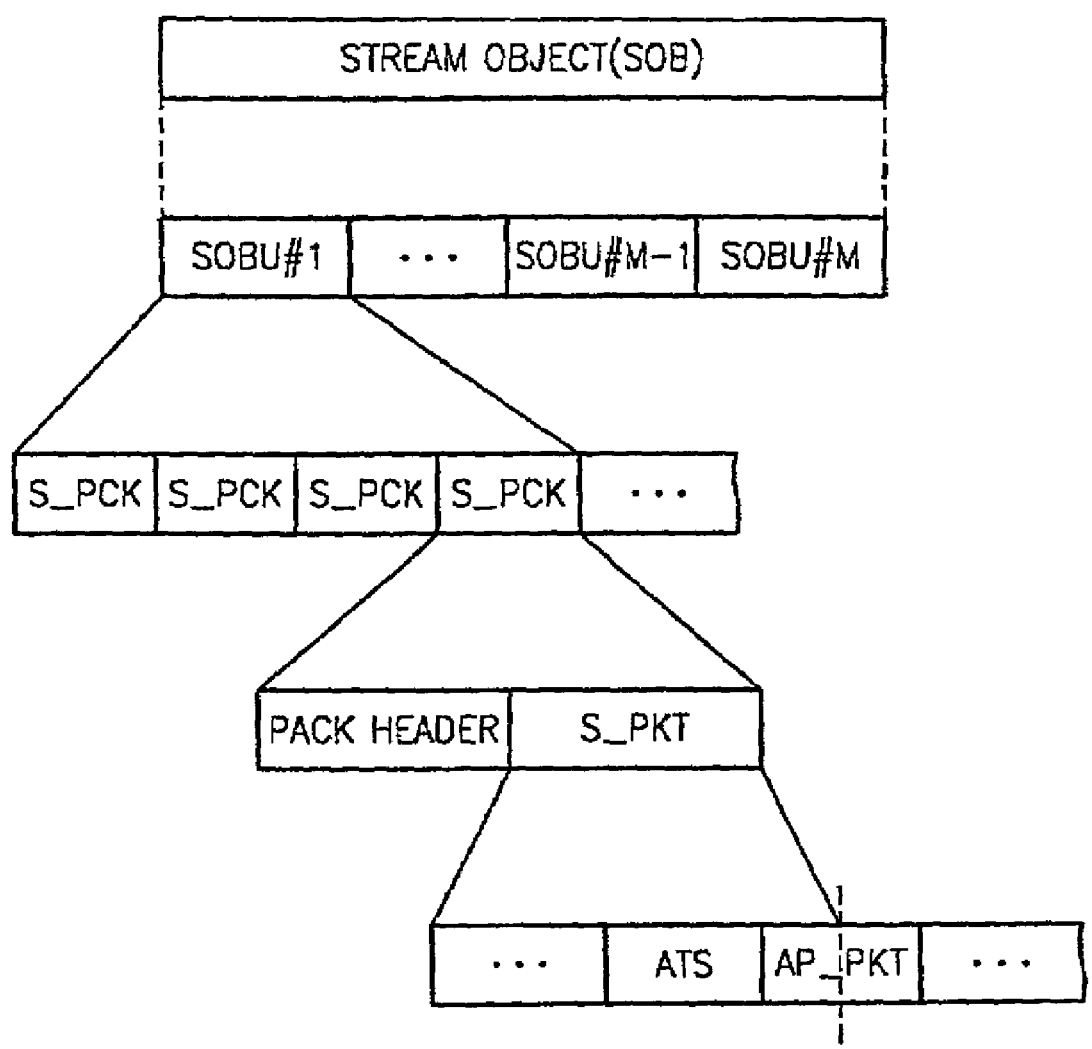
FIG. 1 shows the data structure of a conventional program.
Figure 2:
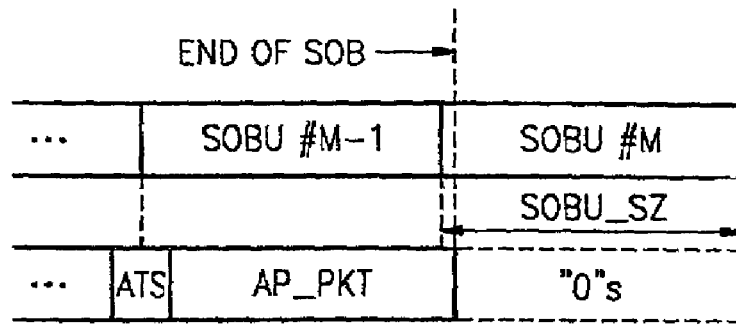
FIG. 2 illustrates a case where there is no Application Time Stamp (ATS) in a stream object unit (SOBU)
Figure 3:
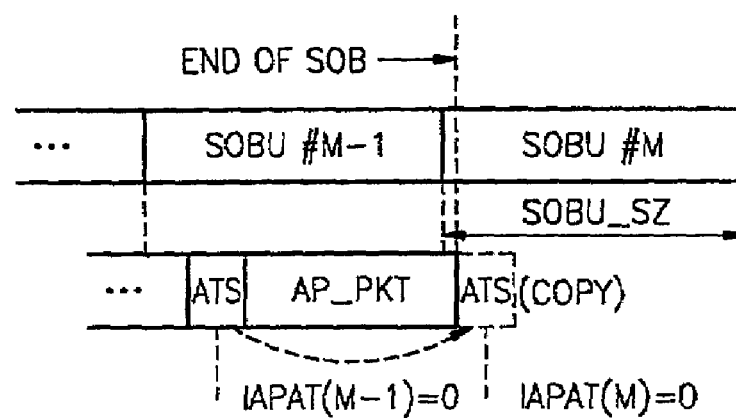
FIG. 3 illustrates a conventional method for obtaining IAPAT in a case where there is no ATS included in the last SOBU.

Reference will now be made in detail to the present preferred embodiments of the present invention, examples of which are illustrated in the accompanying drawings, wherein like reference numerals to like elements throughout.

A recording medium according to the present invention is a re-writable recording medium in which a user records and edits a program formed of content stream data. Recording content stream data means to record input content stream data without encoding. That is, for example, audio or video stream data such as music or movies is received, buffered, packed in predetermined units, and recorded on the recording medium.

A Digital Versatile Disc-Stream Recording (DVD-SR) medium, which is a recording medium according to the present invention, includes a program recorded in a stream object (SOB), and search information for program navigation. Here, as in the prior art, the SOB means a program, such as music or a movie, which is recorded in the form of content stream data, and includes one or more stream packs (S_PCK). The SOB is formed of one or more Stream Object Units (SOBUs) which are connected as a chain. An SOBU is a unit recording and/or editing, and has a predetermined size of data. However, since an input and/or output speed of data streams forming a program may change when data is recorded and/or reproduced, a length of an SOBU along a time axis may change. The SOBU includes a plurality of stream packs. The SOBUs contained in the same SOB have the same number of stream packs.

A stream pack is formed by a pack header and a stream packet. A stream packet contains one or more application packets (AP_PKT). An application packet (AP_PKT) is a piece of a bit stream which is input when a recording apparatus records data, or output when a reproducing apparatus reproduces data. Therefore, in front of an application packet, a time stamp (ATS) is located. The ATS is reproducing time information of the application packet located just behind the ATS.

Further, there is provided search information having a hierarchical structure containing information on which a cell corresponds to a given program, an SOB corresponds to a given cell, and an SOBU corresponds to a given SOB. Particularly, information on which SOBU corresponds to an SOB is referred to as a MAPping List (MAPL). The mapping list contains an incremental application packet arrival time (IAPAT) indicating a duration of a corresponding SOBU. A rule for obtaining an IAPAT will be explained later.

According to the present invention, each of the SOBUs, excluding a last SOBU contained in a predetermined SOB, has at least one entire ATS. That is, for example, the first byte of at least one ATS is contained in a corresponding SOBU. Hence, a size of an application packet according to the present invention satisfies the following expression:

$$AP\_PKT\_SZ \leq 2018 \times \{SOBU\_SZ\} - 6$$

In particular, when a number of stuffing bytes N_SByte in an SOBU is 0, the following relation is satisfied:

$$AP\_PKT\_SZ \leq 2018 \times \{SOBU\_SZ\} - 5$$

That is, for example, $AP\_PKT\_SZ \leq 2018 \times \{SOBU\_SZ\} - 5$ is satisfied if at least 30 bytes are needed for a pack header, 2 bytes are needed for a header extension, and a stuffing packet is defined in a stream packet, assuming that one SOBU has a number of stream packs equal to the number of SOBU_SZs and $2018 \times \{SOBU\_SZ\} - 2$ is the remaining area. However, considering a size of an ATS is 4 bytes, if a size of an application packet is made to be less than or equal to $2018 \ast \{SOBU\_SZ\} - 6$, then all of the SOBUs, excluding the last SOBU, contains the first byte of at least one ATS.

If the above expression is generalized, the resulting expression is as following:

$$AP\_PKT\_SZ \leq SPayload\_SZ \times \{SOBU\_SZ\} - \{N\_AHE + N\_SByte + ATS\_SZ\}$$

Here, ATS_SZ denotes a byte size of an ATS, SPayload_SZ denotes a size of a data space containing information excluding a fixed header area from a S_PCK, N_AHE denotes a number of application header extensions of a corresponding SOBU, and N_SByte denotes a number of stuffing bytes of a corresponding SOBU.

Figure 4:
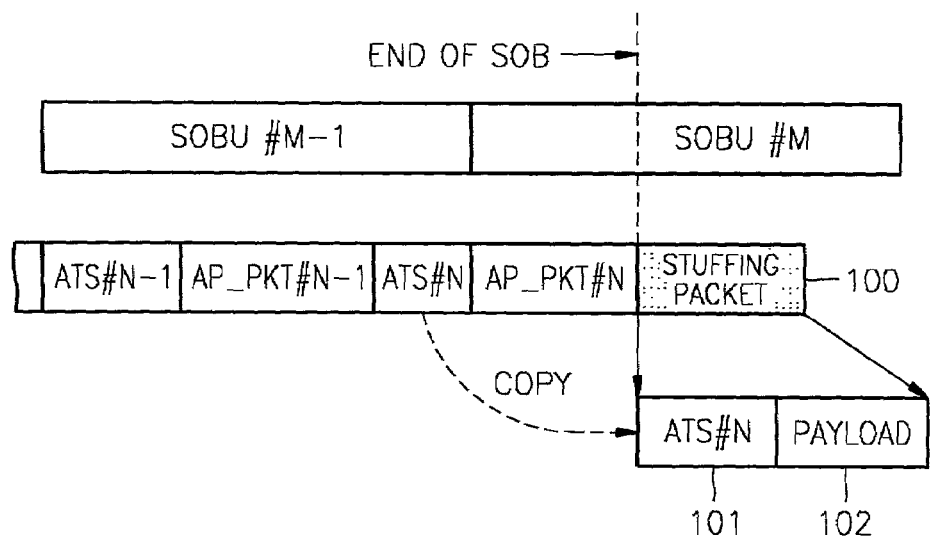
FIG. 4 is a data structure, according to an embodiment of the present invention.

FIG. 4 shows a data structure, according to an embodiment of the present invention.

Referring now to FIG. 4, an SOB is formed of an SOBU chain, in which M SOBUs are connected. Each of the SOBUs, excluding a last SOBU, contains the first byte of at least one ATS. That is, for example, SOBU #M−1 contains the first byte of ATS #N.

SOBU #M does not contain an ATS, but contains all or part of an application packet AP_PKT #N. That is, for example, when there is no ATS contained in the last SOBU, which is SOBU #M, a stuffing packet 100 for correction is recorded after the last application packet AP_$_P$KT #N. The stuffing packet 100 for correction is formed of ATS #N+1 101 and a payload 102. Here, ATS #N+1 301 has a value obtained by adding an integer "1" to ATS #N. This is expressed by the following equation:

$$ATS\ \#N+1 = ATS\#N = 1$$

Here, if ATS #N is an integer, ATS #N+1 is also an integer. ATS #N+1 101 may be recorded as a value obtained by adding an integer to ATS #N. In the payload 102 "0" is recorded. However, since an SOB actually ends at the last application packet AP_PKT #N, and when the SOB is reproduced, data recorded after AP_PKT #N (for example, the last application packet which is not read), the format and content of data recorded in the payload 102 may change in a variety of ways when necessary. In some cases, there may be no data recorded in the payload 102.

Next, a data structure to make a last SOBU have an IAPAT according an embodiment of the present invention will be explained.

Figure 5:
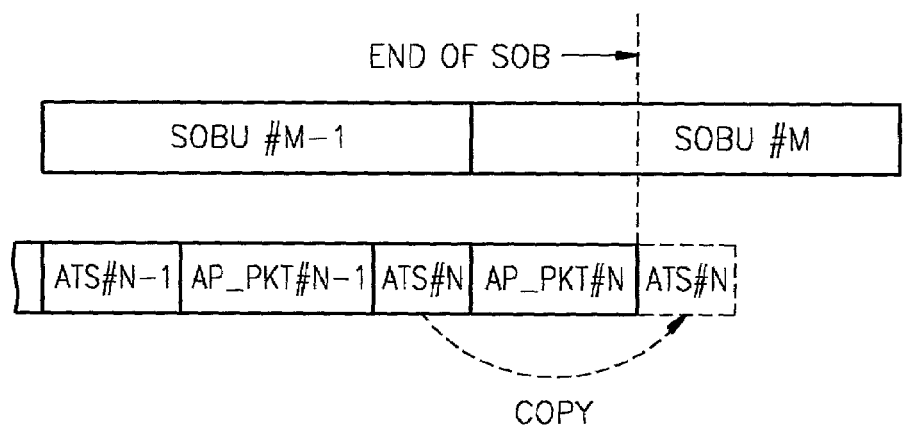
FIG. 5 is a data structure, according to an embodiment of the present invention.

FIG. 5 shows a data structure, according to an embodiment of the present invention.

Referring now to FIG. 5, an SOB is formed of an SOBU chain, in which M SOBUs are connected. Each of the SOBUs, excluding a last SOBU, contains the first byte of at least one ATS. That is, for example, SOBU #M−1 contains the first byte of ATS #N.

As described in FIG. 4, ATS #N+1 has a value obtained by adding the integer "1" to ATS #N, but is not actually recorded. That is, for example, in calculating an IAPAT value required for recording a mapping list as search information, recorded ATS #N+1 is not actually read. However, ATS #N is read and then a value obtained by adding "1" to ATS #N is regarded as ATS #N+1. The IAPAT obtained by regarding the value obtained by adding "1" to ATS #N as ATS #N+1, is recorded in the mapping list as search information. ATS #N+1 may be a value obtained by adding an integer to ATS #N. If ATS #N is an integer, ATS #N+1 is also an integer.

In the present invention, as described above in FIGS. 4 and 5, the first ATS of SOBU #M−1 is ATS #N and the first ATS of SOBU #M is ATS #N+1. Since the first ATSs are different, the IAPAT of the (M−1)-th SOBU is not "0". That is, for example, the IAPAT values of all SOBUs are correctly obtained. Therefore, since each SOBU has an IAPAT value which is distinguished from other IAPAT values, program searching referring to a mapping list is performed smoothly without an error.

The rule for obtaining an IAPAT is as follows.

For i-th SOBU (SOBU(i)) excluding SOBU #M, when an SOB contains M SOBUs, a value obtained by accumulating IAPATs from the first IAPAT (IAPAT(1)) to the i-th IAPAT (IAPAT(i)), should be greater than or equal to an arrival time of the first application packet of SOBU(i+1), and less than a value obtained by adding "1" to the arrival time of the first application packet of SOBU(i+1). Thus, an IAPAT has an integer value and the initial value of an IAPAT is "0". This can be expressed as follows:

$$SOBU\_S\_APAT(i+1) \leq SUM\_IAPAT\ (i) \leq SOBU\_S\_APAT(i+1)+1$$

Here, SOBU_S_APAT(i+1) denotes the arrival time of the first application packet contained in SOBU #i+1, and SUM_IAPAT(i) denotes a value obtained by accumulating the IAPATs of SOBU#i and all preceding SOBUs.

Also, as for SOBU #M, a value obtained by accumulating all IAPATs is greater than the arrival time of the last application packet contained in the SOBU #M, and less than or equal to a value obtained by adding "1" to the arrival time of the last packet contained in the SOBU #M. This can be expressed as follows:

$$SOBU\_E\_APAT(M) \leqq SUM\_IAPAT(M) \leqq SOBU\_E\_APAT(M)+1$$

Here, SOBU_E_APAT(M) denotes the arrival time of the last application packet contained in SOBU #M.

Figure 6:
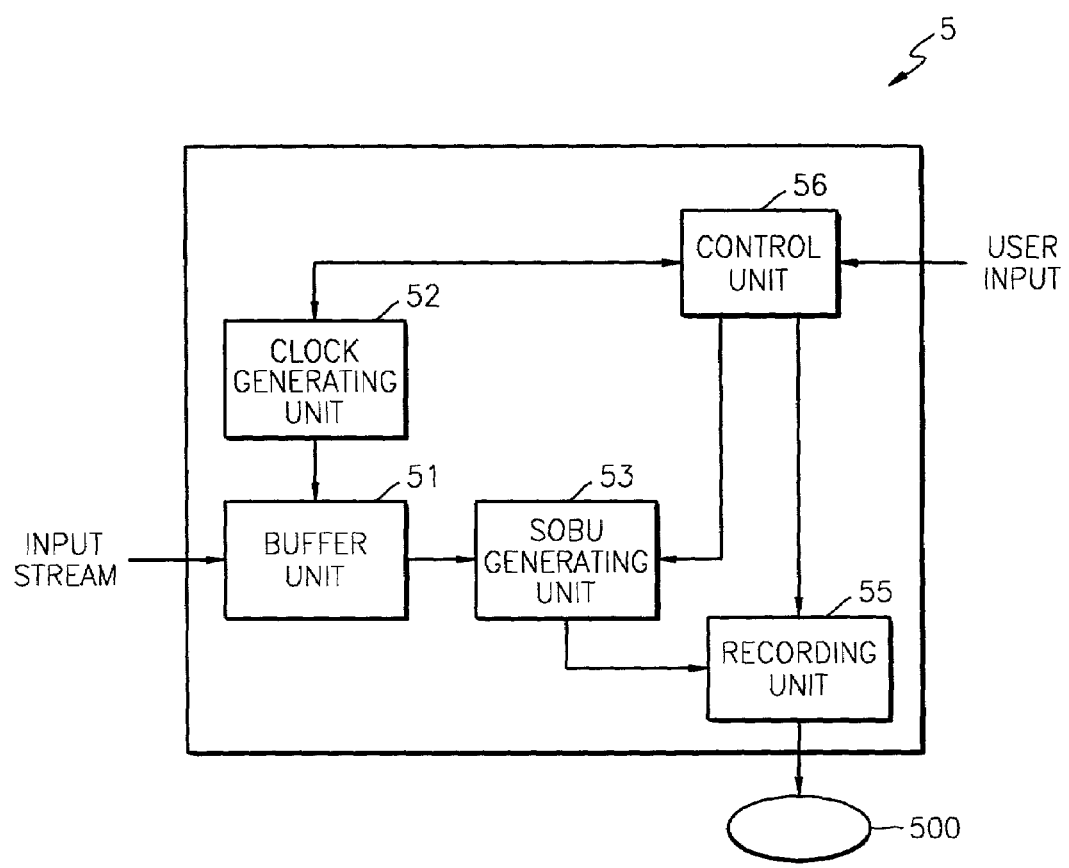
FIG. 6 is a block diagram of a recording apparatus, according to an embodiment of the present invention.

FIG. 6 is a block diagram of a recording apparatus, according to an embodiment of the present invention.

Referring now to FIG. 6, the recording apparatus 5 records contents such as music or movies in one SOB having one of the data structures as described above in FIGS. 4 and 5, and has a buffer unit 51, a clock generating unit 52, an SOBU generating unit 53, a recording unit 55, and a control unit 56. The buffer unit 51 receives content stream data from the outside and outputs the content stream data by buffering the content stream data based on the clock values provided from the clock generating unit 52. The SOBU generating unit 53 generates SOBUs by packing content stream data. The recording unit 55 records SOBUs and search information such as a mapping list on an optical recording medium 500 based on controls from the control unit 56. The control unit 56 generates a mapping list and provides the mapping list to the recording unit 55, while controlling the entire recording apparatus 5 so that content stream data is recorded on the optical recording medium 500.

In view of the structure described above, a recording method according to an embodiment of the present invention is explained below.

When content stream data is input to the buffer unit 51 from an application apparatus such as a set-top-box, and a user pushes a recording button (not shown) of the recording apparatus 5, the control unit 56 resets the clock generating unit 52. Then, the clock generating unit 52 generates clock values from "0" and provides the clock values to the buffer unit 51.

The buffer unit 51 attaches the clock values received from the clock generating unit 52 to the received content stream data, and outputs the received content stream data by buffering the content stream data. The SOBU generating unit 53 packs the content stream data received from the buffer unit 51 into SOBUs. The generated SOBUs are transmitted to the recording unit 55, and the recording unit 55 records the received SOBUs on the optical recording medium 500 based on the controls from the control unit 56.

As shown in FIG. 4, if SOBU #M−1, which is the second SOBU from the end of the SOB, contains at least one entire ATS, and SOBU #M, which is the last SOBU, does not contain an ATS, a stuffing packet 300 for correction is recorded continuously after the last application packet AP_PKT #N. A value obtained by adding the integer "1" to ATS #N is recorded as ATS #N+1 in the present embodiment. "0" is recorded in the payload according to the present embodiment.

Also, the recording unit 55 records the mapping list, provided from the control unit 56, as navigation data in a search information recording area of the optical recording medium 500.

A recording method according to an embodiment of the present invention is further explained below.

When content stream data is input to the buffer unit 51 from an application apparatus such as a set-top-box, and a user pushes a recording button (not shown) of the recording apparatus 5, the control unit 56 resets the clock generating unit 52. Then, the clock generating unit 52 generates clock values from "0" and provides the clock values to the buffer unit 51.

The buffer unit 51 attaches the clock values received from the clock generating unit 52 to the received content stream data, and outputs the received content stream data by buffering the content stream data. The SOBU generating unit 53 packs the content stream data received from the buffer unit 51, and generates SOBUs. The generated SOBUs are transmitted to the recording unit 55, and the recording unit 55 records the received SOBUs on the optical disc 500 based on the controls from the control unit 56.

Also, the recording unit 55 records the mapping list, provided from the control unit 56, as navigation data in a search information recording area of the optical recording medium 500. Here, the mapping list is generated by the control unit 56 and provided to the recording unit 55. More specifically, as shown in FIG. 5, the control unit 56 reads ATS #N, regards a value obtained by adding "1" to ATS #N as ATS #N+1, and records an IAPAT value in the mapping list. This is obtained by the rule described above for ATS #N+1. That is, for example, ATS #N+1 has a value obtained by adding the integer "1" to ATS #N. However, the value is not a value actually recorded as data, but a virtual value used by the control unit 56 in calculating an IAPAT value forming the mapping list. Thus ATS #N+1 may be a value obtained by adding an integer to ATS #N.

Figure 7:
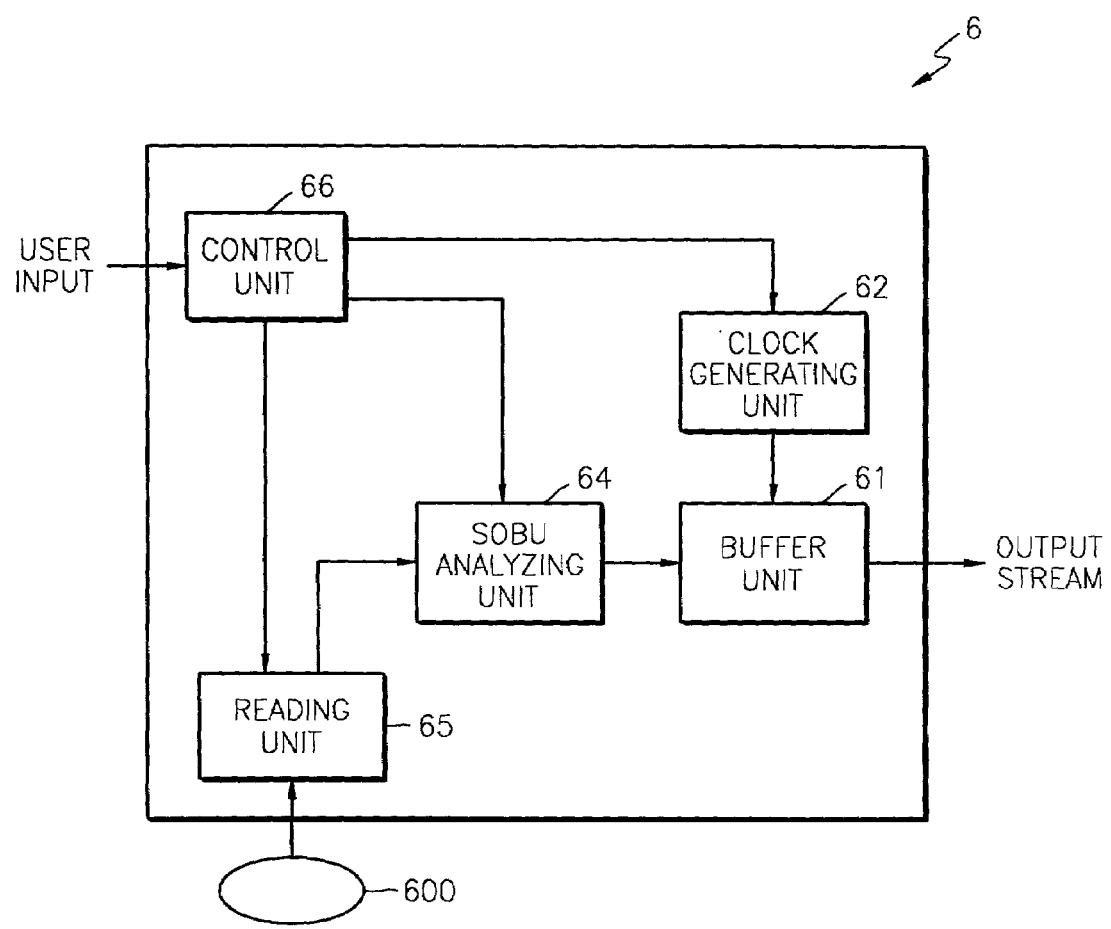
FIG. 7 is a block diagram of a reproducing apparatus, according to an embodiment of the present invention.

FIG. 7 is a block diagram of a reproducing apparatus, according to an embodiment of the present invention.

Referring now to FIG. 7, the reproducing apparatus 6 reproduces contents from an optical recording medium 600 on which data having the data structure described in FIGS. 4 through 6, is recorded, and has a control unit 66, a reading unit 65, an SOBU analyzing unit 64, a clock generating unit 62, and a buffer unit 61.

The control unit 66 decodes various control information including a mapping list and controls the entire reproducing apparatus so that contents recorded on the optical recording medium 600 are reproduced based on a user's requirements.

The reading unit 65 reads data from the optical recording medium 600. The SOBU analyzing unit 64 extracts content stream data forming contents by analyzing read SOBUs, and outputs content stream data by buffering content stream data based on the clock values provided from the clock generating unit 62.

In view of the structure described above, a reproducing method according to an embodiment of the present invention is explained below.

If a user requests to reproduce predetermined contents by pushing a reproducing button (not shown) of the reproducing apparatus 6, the control unit 66 commands the reading unit 65 to read search information including a mapping list recorded on the optical recording medium 600. Received search information including the mapping list, provided from the reading unit 65, is used to find out the corresponding SOB or the corresponding SOBU. As shown in FIG. 4, even if all of the SOBUs contained in the SOB, excluding the last SOBU, have at least one entire ATS and the last SOBU has no ATS, a stuffing packet 300 for correction containing ATS #N+1 which has a value obtained by adding an integer "1" to ATS #N, following the last application packet AP_PKT #N, is recorded on the optical recording medium 600. A mapping list having an IAPAT obtained based on the stuffing packet 300 for correction is recorded as search information. Therefore, searching for contents and reproducing desired contents once located is smoothly performed.

The control unit 66 resets the clock generating unit 62. Then, the clock generating unit 62 generates clock values from "0" and provides the clock values to the buffer unit 61.

The reading unit 65 reads recorded contents and provides the contents to the SOBU analyzing unit 64. The SOBU analyzing unit 64 extracts content stream data from the provided SOBU. The buffer unit 61 outputs the corresponding content stream data at a time when the clock value provided from the clock generating unit 62 becomes the same as the clock value attached to the received content stream data.

A reproducing method according to an embodiment of the present invention is explained below.

If a user requests to reproduce predetermined contents by pushing a reproducing button (not shown) of the reproducing apparatus, the control unit 66 commands the reading unit 65 to read search information including a mapping list recorded on the optical recording medium 600. Received search information including the mapping list, provided from the reading unit 65, is used to find out the corresponding SOB or the corresponding SOBU. As shown in FIG. 5, even if all of the SOBUs contained in the SOB, excluding the last SOBU, have at least one entire ATS and the last SOBU has no ATS, a mapping list containing an IAPAT is recorded as search information. Therefore, searching for contents and reproducing desired contents are performed. The IAPAT obtained by regarding ATS#N+1 is obtained by adding the integer "1" to ATS#N for SOBU #M.

The control unit 66 resets the clock generating unit 62. Then, the clock generating unit 62 generates clock values from "0" and provides the clock values to the buffer unit 61.

The reading unit 65 reads recorded contents and provides the contents to the SOBU analyzing unit 64. The SOBU analyzing unit 64 extracts content stream data from the provided SOBU. The buffer unit 61 outputs the corresponding content stream data at a time when the clock value provided from the clock generating unit 62 becomes the same as the clock value attached to the received content stream data.

Figure 8:
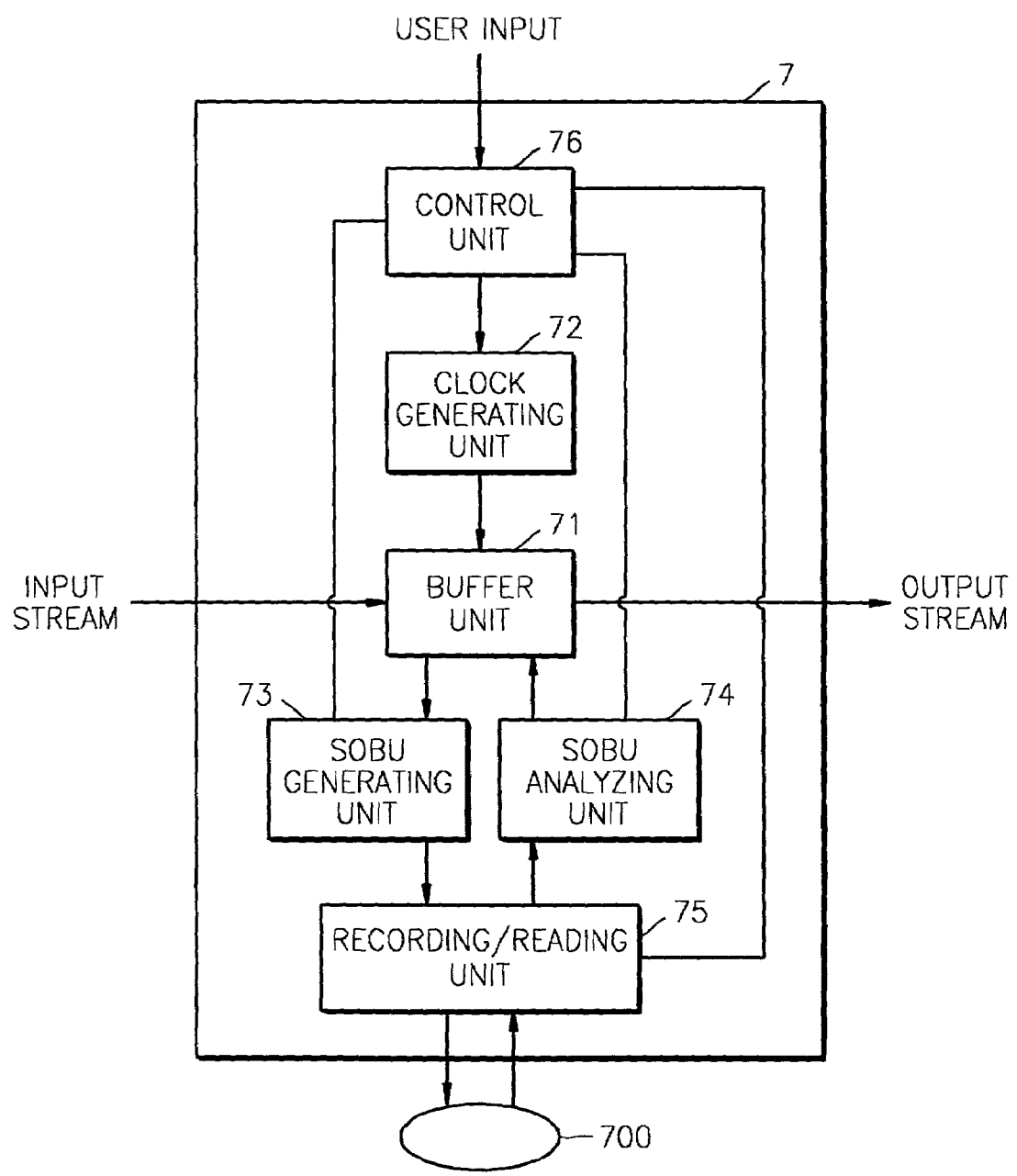
FIG. 8 is a block diagram of a recording and reproducing apparatus, according to an embodiment of the present invention.

FIG. 8 is a block diagram of a recording and reproducing apparatus, according to an embodiment of the present invention.

Referring now to FIG. 8, the recording and reproducing apparatus 7 is implemented by combining the recording apparatus 5 of FIG. 6 and the reproducing apparatus 6 of FIG. 7 in one unit. The recording and reproducing apparatus 7 has a recording/reading unit 75, an SOBU generating unit 73, an SOBU analyzing unit 74, a buffer unit 71, a clock generating unit 72, and a control unit 76. Thus, for example, in recording, each piece of content such as a music track or a movie is recorded as one SOB having the data structure described above. In reproducing, for example, contents are reproduced from an optical recording medium 700 on which data having the structure as explained in FIGS. 4 through 6, are recorded.

In recording, the buffer unit 71 receives content stream data from the outside, and outputs the content stream data by buffering the content stream data based on clock values provided from the clock generating unit 72. In reproducing, the buffering unit 71 outputs content stream data by buffering the content stream data based on clock values provided from the clock generating unit 72.

The SOBU generating unit 73 generates SOBUs by packing content stream data. The SOBU analyzing unit 74 extracts content stream data forming contents by analyzing SOBUs.

In recording, the recording/reading unit 75 records SOBUs and search information such as a mapping list on the optical recording medium 700, based on control of the control unit 76 and content stream data packed in SOBUs. In reproducing, the recording/reading unit 75 reads search information including a mapping list, or SOBUs recorded on the optical recording medium 700, at the request of the control unit 76.

In recording, the control unit 76 generates a mapping list and provides the mapping list to the recording/reading unit 75 and thus, controls the entire recording and reproducing apparatus 7 so that content stream data is recorded on the optical recording medium 700. In reproducing, the control unit 76 decodes various control information including the mapping list, and controls the entire recording and reproducing apparatus 7 so that contents recorded on the optical recording medium 700 reproduced.

The recording and reproducing method of the recording and reproducing apparatus 7, having the structure described above, are the same as those of the above-described recording apparatus 5 and reproducing apparatus 6, respectively.

According to the methods and apparatuses described above, the IAPAT values of all SOBUs are correctly obtained. Therefore, program searching when referring to a mapping list is smoothly performed without an error.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording medium on which content stream data is recorded as a stream object, comprising:
one or more stream object units having the content stream data, each having a predetermined size and one or more stream packs,
each of the stream packs having at least part of an application time stamp indicating reproducing time information and an application packet, corresponding to the application time stamp, in which the content stream data is packed,
wherein each of the stream object units having the content stream data, excluding a last stream object unit, has at least one entire application time stamp;
wherein a size of the application packet is small enough so that each of the stream object units excluding the last stream object unit includes at least one entire application time stamp; and
wherein a size of an application packet AP_PKT_SZ satisfies the following relation:

AP_PKT_SZ≦SPayload_SZ×{SOBU_SZ}−{N_AHE+N_SByte+ATS_SZ}, where, SOBU_SZ denotes a size of a corresponding stream object unit, ATS_SZ denotes a size of an application time stamp which is formed in units of bytes, SPayload_SZ denotes a size of a data space containing information excluding a fixed header area from the stream pack, N_AHE denotes a number of application header extensions of said corresponding stream object unit, and N_SByte denotes a number of stuffing bytes of said corresponding stream object unit.

2. The recording medium of claim 1, wherein the last stream object unit has a stuffing packet for correction which includes a predetermined time stamp, said stuffing packet is recorded continuously after a last application packet in the stream object.

3. The recording medium of claim 2, wherein the predetermined time stamp is obtained by adding an integer to an application time stamp of a last application packet in the stream object.

4. The recording medium of claim 1, wherein the size of the application packet AP_PKT_SZ satisfies the following relation:

$$AP\_PKT\_SZ \leq 2018*\{SOBU\_SZ\}-6,$$

where, SOBU_SZ denotes the size of said corresponding stream object unit.

5. The recording medium of claim 1, wherein when N_SByte is 0, the size of the application packet satisfies the following relation:

$$AP\_PKT\_SZ \leq 2018 \times \{SOBU\_SZ\}-5,$$

where, SOBU_SZ denotes the size of said corresponding stream object unit.

6. The recording medium of claim 5, further comprising: a MAPping List (MAPL) having an Incremental Application Packet Arrival Time (IAPAT) indicating a duration of said corresponding stream object unit as search information indicating which of the stream object units is included in a corresponding stream object.

7. A recording medium on which content stream data is recorded as a stream object, comprising:
one or more stream object units having the content stream data, each having a predetermined size and one or more stream packs,
each of the stream packs having at least part of an application time stamp indicating reproducing time information and an application packet, corresponding to the application time stamp, in which the content stream data is packed,
wherein a stream object unit having no application time stamp, among the stream object units having the content stream data, has a predetermined application time stamp and a stuffing packet for correction which is recorded continuously after a last application packet included in the stream object;
wherein a size of the application packet is small enough so that each of the stream object units excluding the stream object unit having no application time stamp includes at least one entire application time stamp; and
wherein a size of an application packet AP_PKT_SZ satisfies the following relation:

$$AP\_PKT\_SZ \leq SPayload\_SZ \times \{SOBU\_SZ\}- \{N\_AHE+N\_SByte+ATS\_SZ\},$$

where, SOBU_SZ denotes a size of a corresponding stream object unit, ATS_SZ denotes a size of an application time stamp which is formed in units of bytes, SPayload_SZ denotes a size of a data space containing information excluding a fixed header area from the stream pack, N_AHE denotes a number of application header extensions of said corresponding stream object unit, and N_SByte denotes a number of stuffing bytes of said corresponding stream object unit.

8. A recording apparatus recording a stream object formed with at least one stream object unit having content stream data and having one or more stream packs, each of the stream packs having at least part of an application time stamp indicating reproducing time information and an application packet, corresponding to the application time stamp, in which the content stream data is packed, the recording apparatus comprising:
a control unit generating a mapping list as search information;
a clock generation unit generating a clock value;
a buffer unit buffering input content stream data, adding the clock value provided by the clock generation unit to the input content stream data, and outputting result;
a Stream Object Unit (SOBU) generating unit packing the content stream data output from the buffer unit and generating the stream object units having the content stream data so that each of the stream object units, excluding a last stream object unit, includes at least one entire application time stamp; and
a recording unit recording the generated stream object units for the recording and the mapping lists;
wherein a size of the application packet is small enough so that each of the stream object units excluding the last stream object unit includes at least one entire application time stamp; and
wherein a size of an application packet AP_PKT_SZ satisfies the following relation:

$$AP\_PKT\_SZ \leq SPayload\_SZ \times \{SOBU\_SZ\}- \{N\_AHE+N\_SByte+ATS\_SZ\}$$

where, SOBU_SZ denotes a size of a corresponding stream object unit, ATS_SZ denotes a size of an application time stamp which is formed in units of bytes, SPayload_SZ denotes a size of data space containing information excluding a fixed header area from the stream pack, N_AHE denotes a number of application header extensions of said corresponding stream object unit, and N_SByte denotes a number of stuffing bytes of said corresponding stream object unit.

9. The recording apparatus of claim 8, wherein the size of the application packet AP_PKT_SZ satisfies the following relation:

$$AP\_PKT\_SZ \leq 2018 \times \{SOBU\_SZ\}-6$$

where, SOBU_SZ denotes the size of said corresponding stream object unit.

10. The recording apparatus of claim 8, wherein when N_S Byte is 0, the size of the application packet satisfies the following relation:

$$AP\_PKT\_SZ \leq 2018 \times \{SOBU\_SZ\}-5$$

where, SOBU_SZ denotes the size of the corresponding stream object unit.

11. The recording apparatus of claim 8, wherein the mapping list includes an Incremental Application Packet Arrival Time (IAPAT) indicating a duration of the corresponding stream object unit, as search information indicating which of the stream object unit is included in a corresponding Stream Object (SOB).

12. A recording apparatus recording a stream object formed with at least one stream object recording unit having one or more stream packs, each of the stream packs having at least part of an application time stamp indicating reproducing time information and an application packet, corresponding to the application time stamp, in which the content stream data is packed, the recording apparatus comprising:
a clock generation unit generating a clock value;
a buffer unit buffering input content stream data, adding the clock value provided by the clock generation unit to the input content stream data, and outputting a result;

a Stream Object Unit (SOBU) generating unit generating a plurality of stream object recording units;

a control unit generating search information by regarding a stream object recording unit having no application time stamp to include a predetermined application time stamp and search information; and a recording unit recording the plurality of generated stream object recording units;

wherein a size of the application packet is small enough so that each of the plurality of stream object recording units, excluding a last stream object recording unit, includes one entire application time stamp; and wherein a size of an application packet AP_PKT_SZ satisfies the following relation:

$$AP\_PKT\_SZ \leq SPayload\_SZ \times \{SOBU\_SZ\} - \{N\_AHE + N\_SByte + ATS\_SZ\}$$

where SOBU_SZ denotes a size of a corresponding stream object recording unit, ATS_SZ denotes a size of an application time stamp which is formed in units of bytes, SPayload_SZ denotes a size of data space containing information excluding a fixed header area from the stream pack, N_AHE denotes a number of application header extensions of said corresponding stream object recording unit, and N_SByte denotes a number of stuffing bytes of said corresponding stream object recording unit.

13. The recording apparatus of claim 12, wherein the control unit generates search information by regarding a value which is obtained by adding an integer to a value of an application time stamp of a last stream pack included in the stream object, as the value of the predetermined application time stamp.

14. The recording apparatus of claim 13, wherein the search information includes a mapping list.

15. The recording apparatus of claim 12, wherein the control unit generates search information by regarding a value which is obtained by adding an integer to an integer part of an application time stamp of a last stream pack in the stream object, as the value of the predetermined application time stamp.

16. The recording apparatus of claim 12, wherein the size of the application packet AP_PKT_SZ satisfies the following relation:

$$AP\_PKT\_SZ \leq 2018 \times \{SOBU\_SZ\} - 6,$$

where, SOBU_SZ denotes the size of the corresponding stream object recording unit.

17. The recording apparatus of claim 12, wherein when N_SByte is 0, the size of the application packet satisfies the following relation:

$$AP\_PKT\_SZ \leq 2018 \times \{SOBU\_SZ\} - 5$$

where, SOBU_SZ denotes the size of the corresponding stream object recording unit.

18. A reproducing apparatus reproducing data on a recording medium on which a stream object formed with at least one stream object unit having one or more stream packs, each of the stream packs having at least part of an application time stamp indicating reproducing time information and an application packet, corresponding to the application time stamp, in which the content stream data is packed, and a mapping list having search information, the reproducing apparatus comprising:

a reading unit reading the mapping list; and a control unit searching for a corresponding stream object unit by referring to generated search information and by regarding a value which is obtained by adding an integer to a value of an application time stamp of a last stream pack of the stream object, as the value of an application time stamp for a last stream object unit in the stream object when referring to the read mapping list;

wherein a size of the application packet is small enough so that each of the stream object units excluding the last stream object unit includes at least one entire application time stamp; and wherein a size of an application packet AP_PKT_SZ satisfies the following relation:

$$AP\_PKT\_SZ \leq SPayload\_SZ \times \{SOBU\_SZ\} - \{N\_AHE + N\_SByte + ATS\_SZ\},$$

where, SOBU_SZ denotes a size of a corresponding stream object unit, ATS_SZ denotes a size of an application time stamp which is formed in units of bytes, SPayload_SZ denotes a size of a data space containing information excluding a fixed header area from the stream pack, N_AHE denotes a number of application header extensions of said corresponding stream object unit, and N_SByte denotes a number of stuffing bytes of said corresponding stream object unit.

19. The reproducing apparatus of claim 18, wherein the search information includes an Incremental Application Packet Arrival Time.

20. The reproducing apparatus of claim 18, wherein the reading unit comprises:

a Stream Object Unit (SOBU) interpreting unit which reads the stream object units, interpreting the read stream object units, and outputting the content stream data;

a clock generating unit generating a clock value; and a buffer unit buffering the content stream data provided by the SOBU interpreting unit, based on the clock value provided by the clock generating unit, and outputting the content stream data.

* * * * *